United States Patent [19]

Crain, Jr.

[11] Patent Number: 4,996,761

[45] Date of Patent: Mar. 5, 1991

[54] DRILLING/RIVETING COMBINATION TOOL

[76] Inventor: William G. Crain, Jr., 304 Goshen Ave., Elkhart, Ind. 46516

[21] Appl. No.: 450,529

[22] Filed: Dec. 14, 1989

[51] Int. Cl.[5] ........................ B23P 23/04; B23B 45/00; B21J 15/00

[52] U.S. Cl. ........................................... 29/560; 7/158; 72/391; 408/20

[58] Field of Search .................... 408/20, 124; 29/560, 29/243.53, 243.52, 235; 7/158; 72/391

[56] References Cited

U.S. PATENT DOCUMENTS

| | | | |
|---|---|---|---|
| 2,965,258 | 12/1960 | Wilson et al. | 72/391 X |
| 3,412,594 | 11/1968 | Lund | 72/391 |
| 3,712,751 | 1/1973 | Dietrich | 408/20 |
| 3,783,955 | 1/1974 | Gill | 408/20 |
| 3,965,510 | 6/1976 | Ernst | 81/52.4 |
| 4,052,078 | 10/1977 | Benimetzki | 279/93 |
| 4,085,337 | 4/1978 | Moeller | 408/124 |
| 4,171,083 | 10/1979 | Lippacher et al. | 173/29 |
| 4,320,544 | 3/1982 | Bryant et al. | 408/713 |
| 4,468,828 | 9/1984 | Moores, Jr. | 7/158 |
| 4,750,347 | 6/1988 | Saarinen | 29/243.53 |

*Primary Examiner*—William Briggs
*Attorney, Agent, or Firm*—Barnes & Thornburg

[57] ABSTRACT

A combination tool for forming a hole in a structure and for installing a rivet in the hole comprises an elongate body, a drill on one end of the body for forming a hole in a structure, a rivet head mounted along the body, and a manually operated lever for generating a pulling force and transmitting the force to the rivet head when a rivet is to be installed. The elongate body preferably includes an integral housing which includes first and second ends, and which has a longitudinal axis. The drilling tool extends from the first end of the body along the longitudinal axis. The rivet head faces outwardly from the body along an axis which lies in a plane which extends transversely to the longitudinal axis of the body. The tool holder is rotatably driven by an electrical, pneumatic, or hydraulic motor. A rechargeable battery pack may be used in combination with an electrical motor to increase portability, convenience and efficiency of use. The pulling force for the riveting operation is preferably manually generating by squeezing a lever, which is pivotally mounted to the first end of the housing, and which extends toward the second end of the housing which serves as a handle for the tool. The lever is preferably provided with an offset to allow the free end of the lever to be aligned with the handle of the tool when a closing force is applied.

18 Claims, 1 Drawing Sheet

DRILLING/RIVETING COMBINATION TOOL

BACKGROUND AND SUMMARY OF THE INVENTION

This invention relates generally to combination tools and, more specifically, to a combination hand tool which combines the attributes of a motorized rotating bit drilling tool and a riveting tool.

Combination tools are well known in the prior art. A number of prior art patents disclose combination tools which are used for a wide variety of tasks. For example, U.S. Pat. No. 3,712,751 shows a multiple purpose power tool which comprises a rotary portion and a reciprocator portion. Various attachments are used in connection with these portions to produce a portable or bench tool which can be used as an electric drill, drill press, stationary or portable grinder, stationary or portable filer, band saw, skill saw, horizontal and angle mill. U.S. Pat. No. 3,783,955 shows a pneumatically operated power tool having two work implements, such as a drill bit and a screwdriver bit, located at opposite ends of a body which is mounted to a handle. The bits face in opposite directions and the body is turned through 180° to bring one or the other of the implements into a working position. U.S. Pat. No. 3,965,510 shows a combination tool which includes a drilling element and a coaxially mounted wrenching element which can be used to tighten a screw, bolt or nut. U.S. Pat. No. 4,052,078 shows a power transmission collar which appears to be an accessory device for use with an electric drill. The device is used intermittently with the electric drill for setting rivets in holes which are presumably formed by the drill. U.S. Pat. No. 4,171,083 shows a drilling and driving device which is powered by electricity supplied through a power cord. The device includes a drilling tool, and a pivotally mounted percussion attachment which can be positioned over the drilling tool for driving a fastening element into a hole formed by the drilling tool. U.S. Pat. No. 4,320,544 shows a hand held combination drill and screwdriver. U.S. Pat. No. 4,468,826 shows a combination drill and hammer tool for use in forming holes and setting fasteners in masonry.

The above-discussed patents are illustrative of a number of combination tools which are known to exist in the prior art. Although such devices may be useful in a variety of situations and for a variety of tasks, there does not appear to be a single combination tool in the prior art which is especially well-suited for drilling a hole in a structure and installing a rivet therein.

Accordingly, an object of the present invention is to provide a combination hand tool which advantageously combines the attributes of a drill and a riveter in a single tool.

Another object of the present invention is to provide a combination hand tool which functions as a single tool to minimize the time and labor costs associated with the installation of rivets.

Yet another object of the present invention is to provide a combination hand tool which is portable in design, very efficient and convenient to use, and which can be operated by a built-in power supply, such as a rechargeable battery pack.

These and other objects of the invention are attained in a combination tool for forming a hole in a structure and for installing a rivet in the hole, which comprises: an elongate body having first and second ends and a longitudinal axis; means extending from the first end of the body along the longitudinal axis for forming a hole in a structure; a rivet head mounted along the body and facing outwardly from the body along an axis which lies in a plane which extends transversely to the longitudinal axis of the body; and means for generating a pulling force along the transverse axis and transmitting the force to the rivet head when a rivet is to be installed. The means for forming the hole in the structure comprises a tool holder, such as a drill chuck, and means for rotatably driving the tool holder to effect a drilling operation. The means for rotatably driving the tool holder preferably comprises an electric motor which is powered by a battery pack located in the second end of the tool housing. The electric motor preferably has variable speed capabilities, high torque operating characteristic. Alternatively, a cord powered electric motor, or hydraulically or pneumatically powered motors, may be used. However, the embodiment illustrated in the drawings offers degrees of portability, convenience and ease of operation not attainable by these alternatives.

The means for generating a pulling force along the transverse axis comprises a manually actuated lever pivotally attached to the first end of the body. The lever extends toward the second end of the body along an axis which lies in a plane which crosses the longitudinal axis of the body at an acute angle. The lever preferably includes an offset at or near its approximate midpoint such that the free end of the lever is generally aligned with the second end of the body (i.e., the axis which extends through the free end of the lever lies in a common plane with the longitudinal axis of the body) while the attached end of the lever is offset relative to the first end of the body (i.e., the axis of the attached end of the lever is spaced apart from the longitudinal axis of the body). The free end of the lever is spaced apart from the second end of the body such that a closing force applied to the free end of the lever and the second end of the body generates the pulling force, via mechanical linkage between the lever and rivet head, along the transverse axis when a rivet is installed.

The combination tool of the present invention obviates the need for two separate tools. Previously, both a drill and riveter were needed to complete the process of installing a rivet in a structure. Combining these tools into a single combination tool which may be easily handled and manipulated by the operator minimizes the time required for installing rivets, and many of the cost factors associated therewith. Applications for the device include commercial, industrial, and residential use in sheet metal, siding, recreational vehicle manufacturing, automotive repair, and like applications in which a relatively high volume of rivets are installed.

Other objects, advantages and novel features of the present invention will become apparent from the following detailed description of the invention when considered in conjunction with the accompanying drawings.

DETAILED DESCRIPTION OF THE DRAWINGS

Figure 1:
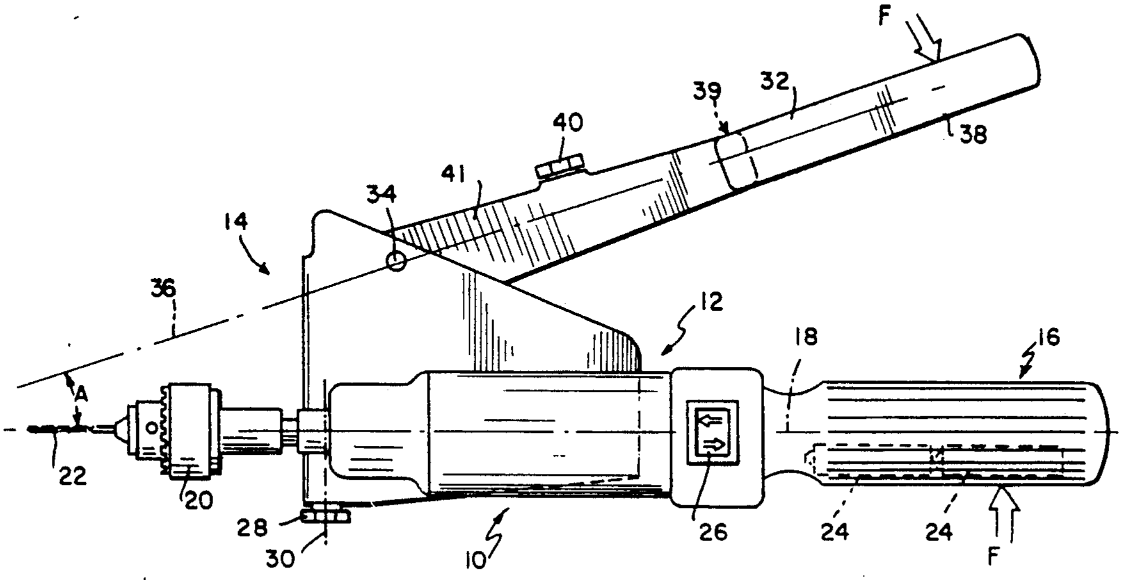
FIG. 1 shows a side view of a combination drilling and riveting tool constructed in accordance with the present invention.

FIG. 1 shows a side view of a combination drilling and riveting tool 10 constructed in accordance with the present invention. Tool 10 has a main body 12 which has a first, or forward, end 14 and a second, or rear, end 16 longitudinally disposed along longitudinal axis 18. A tool holder 20 is mounted along longitudinal axis 18 at the forward end 14 of tool 10. In the embodiment illustrated in FIG. 1, tool holder 20 takes the form of a conventional drill chuck. A drill bit 22 is shown mounted in the jaws of tool holder 20. Tool holder 20 is rotatably driven by an electric drive mechanism (not shown) which is mounted within body 12 of tool 10. A motor having a low or medium RPM, high torque operating characteristic is preferred. In the embodiment illustrated, a rechargeable battery pack 24 is provided in second end 16 of body 12. On/off and directional control switches are provided at 26 to control the rotational operation of tool holder 20. Power can also be provided to the electric motor via a power cord. Alternatively, hydraulic or pneumatic drive components can be employed.

Also mounted in forward end 14 of body 12 is a rivet head 28. Rivet head 28 faces outwardly from body 12 along an axis 30 which lies in a plane which is positioned transversely (approximately 90° in the embodiment illustrated) relative to longitudinal axis 18. Rivet head 28 is offset from the centerline (longitudinal axis 18) of tool 12 for reasons discussed more fully below.

Rivet head 28 is of conventional construction an is designed to grip and pull the mandrel element of a rivet so as to cause the rivet to be properly set in a previously formed hole. The force which is applied by rivet head 28 to the rivet mandrel is generated along axis 30 by, in the preferred embodiment illustrated in FIG. 1, a lever 32 which is pivotally attached to body 12 at location 34 and which is connected to rivet head 28 by mechanical linkage (not shown). Lever 32 extends toward second end 16 of body 12 along an axis 36 which lies in a plane which crosses longitudinal axis 18 of body 12 to form an acute angle A. Lever 32 includes an offset which is illustrated most clearly at 39 in FIG. 2. Due to offset 39, attached end 41 of lever 32 is aligned in a common plane with axis 30 of rivet head 28, while free end 38 of lever 32 is aligned in a common plane with longitudinal axis 18 of body 12. Free end 38 of lever 32 is spaced apart from second end 16 of body 12 such that a closing force F applied to free end 38 of lever 32 and second end 16 of body 12 generates a pulling force along transverse axis 30 when a rivet is installed. This pulling force is transmitted to the mandrel of the rivet being installed by the mechanical linkage referred to above. The presence of offset 39 in lever 32 allows this mechanical linkage to be simplified since passage of the rotating components of the drive mechanism for tool holder 20 through the linkage is not required. At the same time, offset 30 allows free end 38 of lever 32 to be aligned with second end 16 of body 12 such that application of closing force F does not produce a moment which would tend to cause tool 12 to twist or rotate.

A spare rivet head 40 is shown in a "storage" position along the length of lever 32. Rivet head 40 may be interchanged with rivet head 28 to accommodate rivets of differing sizes. It should also be noted that tool holder 20 may be adapted for easy removal from combination tool 10, and may be replaced with drive tools for screws, nuts and bolts, or with other rotatable tools.

Figure 2:
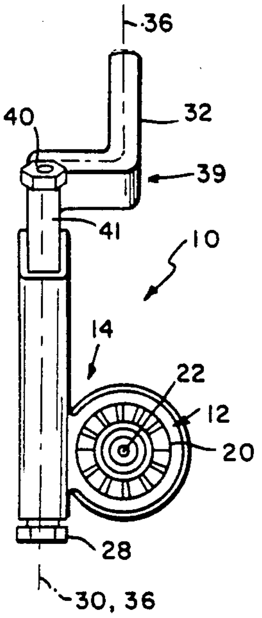
FIG. 2 shows an end view of the combination tool illustrated in FIG. 1.

FIG. 2 shows an end view of combination tool 10, taken facing forward end 14. In the embodiment illustrated, lever 32 is shown positioned directly over the vertical centerline (marked by the top portion of axis 36) of combination tool 10. Rivet head 28 is offset to one side of the centerline (longitudinal axis 18) of body 12 for the reasons noted above.

Figure 3:
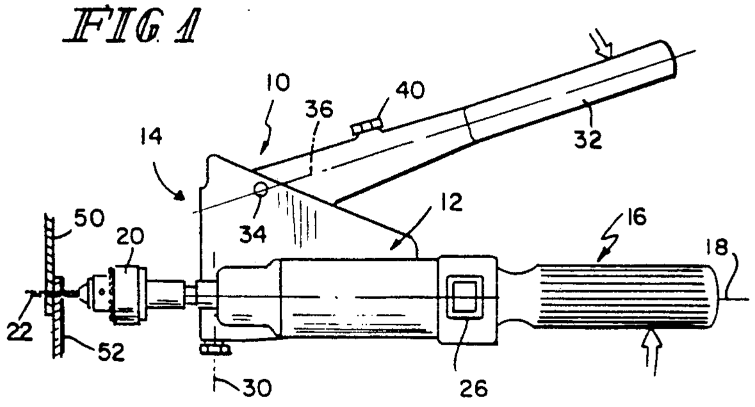
FIG. 3 shows the tool of FIG. 1 as used in performing a drilling operation.
Figure 4:
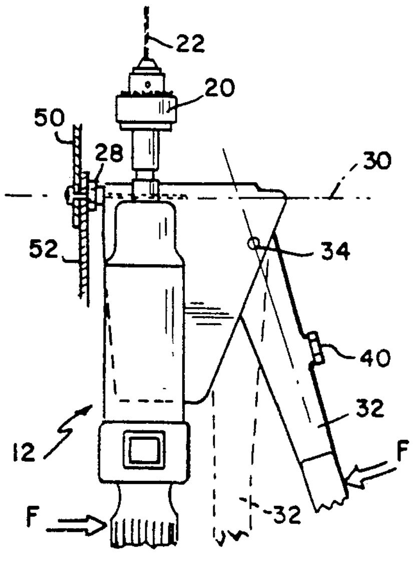
FIG. 4 shows the tool of FIG. 1 as used in performing a riveting operation.

When it has been determined that one or several rivets are to be installed in a structure (such as overlapping members 50 and 52 in FIGS. 3 and 4), a drill bit (such as that illustrated at 22 in the drawings) is installed in the tool holder, and one or more holes are drilled in the appropriate locations. This operation is generally illustrated in FIG. 3 of the drawings. Once drilling is complete, combination tool 10 is turned approximately 90°, relative to the holes, to utilize rivet head 28. A rivet is hand-positioned in an opening provided in rivet head 28, and then positioned in the previously drilled hole. Lever 32 and second end 16 are squeezed together to generate a pulling force along axis 30 to set the rivet in place. Lever 32 is spring-loaded so that it returns to its original position after the rivet has been set. The riveting operation just described is generally illustrated in FIG. 4 of the drawings.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A combination tool for forming a hole in a structure and for installing a rivet in the hole, comprising:

an elongate body having first and second ends and having a longitudinal axis;

means extending from the first end of the body along said longitudinal axis for forming the hole in the structure;

a rivet head mounted along said body and facing outwardly from the body along an axis which lies in a plane which extends transversely to the longitudinal axis of the body; and means for generating a pulling force along the transverse axis and transmitting said force to the rivet head when a rivet is to be installed;

wherein said means for generating a pulling force comprises a manually actuated lever pivotally attached to the first end of the body and extending toward the second end of the body along an axis which lies in a plane which crosses the longitudinal axis of the body at an acute angle.

2. A combination tool according to claim 1, wherein said means for forming the hole comprises a tool holder and means for rotatably driving said tool holder to effect a drilling operation.

3. A combination tool according to claim 1, wherein said means extending from the first end of the body for forming the hole in the structure is replaceable with means for rotatably driving a screw, bolt, nut, or like fastener.

4. A combination tool according to claim 2, wherein said means for rotatably driving said tool holder comprises electrical drive means.

5. A combination tool according to claim 4, wherein said electrical drive means comprises a motor which has a low RPM, high torque operating characteristic.

6. A combination tool according to claim 1, wherein said electrical drive means is powered by a battery pack disposed within the second end of said body.

7. A combination tool according to claim 1, wherein said means for generating a pulling force comprises a manually actuated lever pivotally attached to the first end of the body.

8. A combination tool according to claim 1, wherein said rivet head is offset to one side of the longitudinal axis of the body, and wherein said lever is provided with an offset to allow the free end of the lever to be aligned with the second end of the body such that application of the closing force does not produce a moment tending to twist or rotate the body.

9. A combination tool according to claim 1, wherein a free end of the lever is spaced apart from, but disposed adjacent to, the second end of the body such that a closing force applied to the free end of the lever and the second end of the body generates the pulling force along the transverse axis when a rivet is installed.

10. A combination tool for forming a hole in a structure and for installing a rivet in the hole, comprising:

an elongate body having first and second ends and having a longitudinal axis;

means extending from the first end of the body along said longitudinal axis for forming the hole in the structure;

a rivet head mounted along said body and facing outwardly from the body in an operable position along an axis which lies in a plane which extends transversely to the longitudinal axis of the body, said rivet head being fixedly mounted to the body so that the body is turned through an angle substantially equal to the angle between the longitudinal axis and the axis which extends transversely to the longitudinal axis to align the rivet head with the hole to install a rivet; and means for generating a pulling force along the transverse axis and transmitting said force to the rivet head when a rivet is to be installed.

11. A combination tool according to claim 10, wherein said means extending from the first end of the body for forming the hole in the structure can be replaced with means for rotatably driving a screw, bolt, nut, or like fastener.

12. A combination tool according to claim 12, wherein said means for generating a pulling force comprises a manually actuated lever pivotally attached to the first end of the body and extending toward the second end of the body along an axis which lies in a plane which crosses the longitudinal axis of the body at an acute angle.

13. A combination tool according to claim 12, wherein said means for forming thé hole comprises a tool holder and means for rotatably driving said tool holder to effect a drilling operation.

14. A combination tool according to claim 13, wherein said means for rotatably driving said tool holder comprises electrical drive means.

15. A combination tool according to claim 14, wherein said electrical drive means comprises a motor which has a low RPM, high torque operating characteristic.

16. A combination tool according to claim 12, wherein said means for generating a pulling force comprises a manually actuated lever pivotally attached to the first end of the body.

17. A combination tool according to claim 12, wherein a free end of the lever is spaced apart from, but disposed adjacent to, the second end of the body such that a closing force applied to the free end of the lever and the second end of the body generates the pulling force along the transverse axis when a rivet is installed.

18. A combination tool according to claim 17, wherein said rivet head is offset to one side of the longitudinal axis of the body, and wherein said lever is provided with an offset to allow the free end of the lever to be aligned with the second end of the body such that application of the closing force does not produce a moment tending to twist or rotate the body.

* * * * *